J. E. Emerson,
Circular Saw.

No. 88,949.     Patented Apr. 13. 1869.

Witness;
J. Snowden Bell
H. N. Myga

Inventor;
James E. Emerson
By his attorney N. Crawford

JAMES E. EMERSON, OF TRENTON, NEW JERSEY.

Letters Patent No. 88,949, dated April 13, 1869.

IMPROVEMENT IN CIRCULAR SAWS.

The Schedule referred to in these Letters Patent and making part of the same.

*To whom it may concern:*

Be it known that I, JAMES E. EMERSON, of Trenton, in the county of Mercer, and State of New Jersey, have invented a new and useful Improvement in Circular Saws, which prevents the same from heating; and I do hereby declare that the following is a full and exact description thereof, reference being had to the accompanying drawings, and to the letters of reference marked thereon.

The nature of my invention consists in providing apertures in the body of a circular saw, having insertible teeth, for the purpose of preventing the heating of the saw when in operation.

To enable others skilled in the art to make and use my invention, I will describe its construction.

Figure 1:
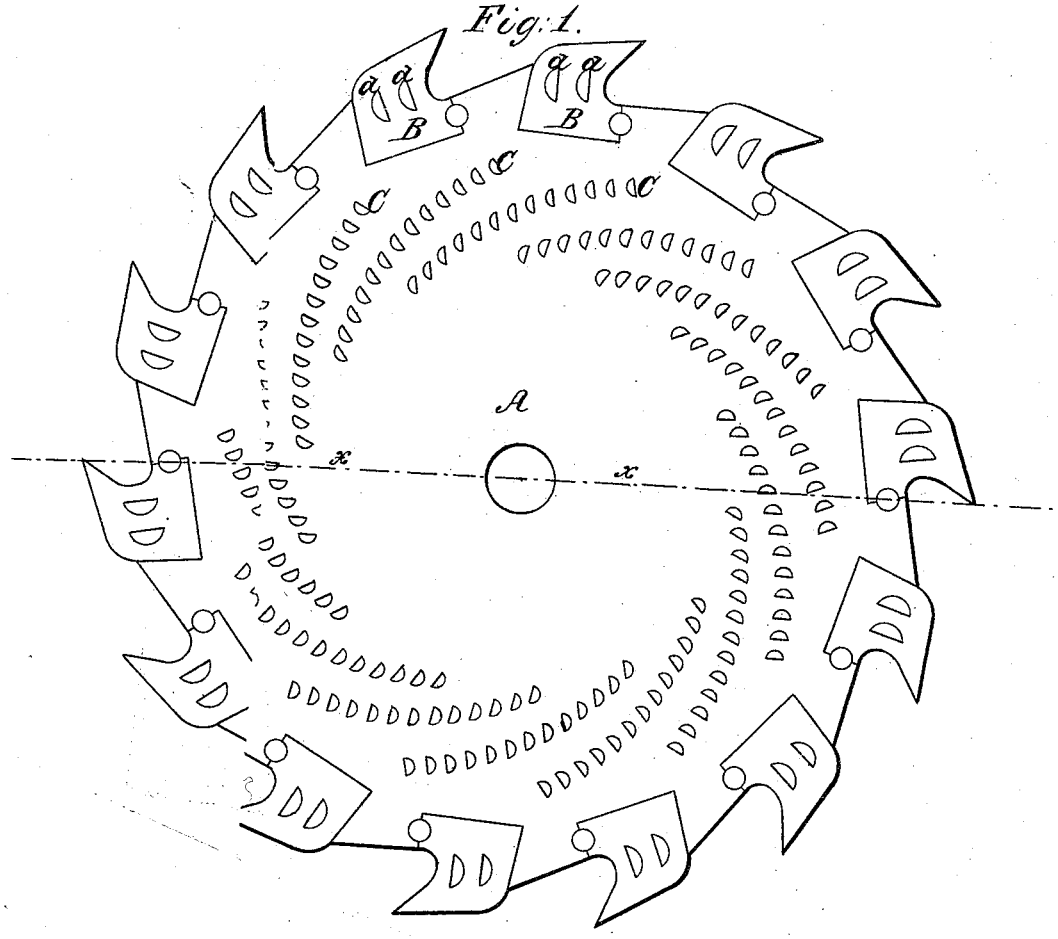
Figure 2:
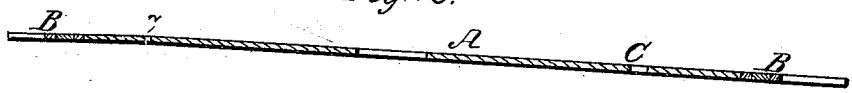

Figure 1 represents a side view of the saw, and
Figure 2 is a cross-section of the same on line $x\ x$.
A represents the plate of a common circular saw;
B, the insertible teeth, having apertures $a\ a$; and
C, a series of apertures through the plate A.

It is obvious to all acquainted with working circular saws with insertible teeth that there is great liability of heating the rim of such saw in consequence of the friction of the saw against the guides, sawdust, and other obstacles, which causes the rim to expand. When such is the case, the insertible teeth may become loose and possibly dislocated or deranged in their position, by reason of such expansion of the rim of the saw, without a corresponding expansion of the teeth.

The great velocity of revolution of saws naturally causes the expansion of the rim, which is increased or diminished in proportion as the velocity of revolution is increased or diminished.

To obviate the difficulties above described, I perforate the plate of the saw with a series of lines of holes extending from near the base of the teeth toward the centre.

These series of holes may vary in their line of direction, size, shape, or relative location with each other, as circumstances or fancy may dictate without departing from my invention.

One of the advantages derived from the perforations or apertures through the plate of the saw and the teeth is that the air can pass readily through the plate, thus keeping the temperature of the saw at or near the temperature of the surrounding air.

Another advantage is, the apertures serve to retain for a long time any lubricating substance, like oil, tallow, or other analogous substance, which, when applied to the saw, readily enters the holes and then works out gradually, as needed, thus keeping the rim of the saw perfectly lubricated and prevents the heating the rim by friction against the guides and furnishes a ready means of ventilation and lubrication, thereby preventing the heating of the saw, which has heretofore been a serious difficulty in working a circular saw, until my invention was brought into successful use, and application to the above-described saws.

Similar apertures have been used in circular saws, as, for instance, such as patented to me July 16, 1867, but such apertures or holes were for an entirely different object and purpose, and their location was not the same as in this, as the object in that patent was to place such holes in the line of wear of the teeth to overcome the necessity of gumming, and such construction of saws I do not now claim, for my present improvement has no relation to the placing the holes in the plate with relation to the gumming, or to alone perforate the teeth, as that has been done before.

I am aware that saws have heretofore been constructed with radial slots, commencing at the periphery of the saw-plate and extending toward and nearly to the eye or arbor-hole of such saw, and that such construction of saw was patented to I. Gove, October 16, 1839.

I am also aware of another construction of circular saws, in which there are radial slots extending from the eye of the saw toward the periphery of the saw-plate, and terminating in a round hole, as was patented November 12, 1867, and numbered 70,728.

Neither of these constructions is my invention; nor do I lay any claim to such construction as my invention, for such continuous open slots, as shown in these patents, cannot produce the results obtained by my improvement, for these continuous slots tend to weaken the plate of such saw and make it no better than a saw-plate made in sections, while in mine, instead of a continuous open slot, only a portion of the plate is cut away, leaving the plate connected to the intervening piece between the apertures, which is, in all cases, enough to hold the saw at all times in position, as well as if no perforations had been made, thus showing a material difference between my present invention and the patents referred to, which I specially disclaim as my invention; but What I do claim, and desire to secure by Letters Patent, is—

A circular saw, when provided with apertures C C C and insertible teeth B, constructed and arranged to operate in the manner and for the purposes substantially as described.

J. E. EMERSON.

Witnesses:
H. N. MYGATT,
J. SNOWDEN BELL.